DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED SEPTEMBER 2, 1975

938 O.G. 6

T938,003

MODIFIED CELLULOSE PROPIONATE COATINGS

Leonard A. Hite, Jr., Rte. 16, 3704 Hemlock Park 37663, and Ronald K. Lit ton, Rte. 4321, Rock Rose Circle 37664, both of Kingsport, Tenn.

Filed June 3, 1974, Ser. No. 475,372

**Int. Cl. C08b *21/08***

U.S. Cl. 260—13

No Drawing. 8 Pages Specification

A coating composition is disclosed which comprises a major amount of cellulose propionate and a minor amount of a compatible polyamide resin. The cellulose propionate contains, by weight, at least about 35% propionyl, between about 4.4% and about 12% hydroxyl and no greater than about 4.5% acetyl, and has a viscosity of between about 0.02 to 20 seconds. The polyamide resin is made by the polymerization of a dimeric fatty acid with one or more polyamines, and has an amine value of between about 27 and about 400. The cellulose propionate and polyamide resin are dissolved in a suitable solvent system and the solution is especially useful as an overprint for wet oxidizing inks.